United States Patent
Khatri et al.

(10) Patent No.: US 9,519,331 B2
(45) Date of Patent: *Dec. 13, 2016

(54) METHOD AND APPARATUS FOR POWER THROTTLING OF HIGHSPEED MULTI-LANE SERIAL LINKS

(71) Applicants: Mukund Khatri, Austin, TX (US); Lee Zaretsky, Austin, TX (US)

(72) Inventors: Mukund Khatri, Austin, TX (US); Lee Zaretsky, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,612

(22) Filed: Oct. 11, 2013

(65) Prior Publication Data

US 2014/0040646 A1 Feb. 6, 2014

Related U.S. Application Data

(63) Continuation of application No. 11/876,401, filed on Oct. 22, 2007, now Pat. No. 8,582,448.

(51) Int. Cl.
*G06F 1/32* (2006.01)

(52) U.S. Cl.
CPC .......... *G06F 1/3253* (2013.01); *G06F 1/3215* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 6,845,402 B1 | 1/2005 | Dwork | |
| 7,136,953 B1 | 11/2006 | Bisson et al. | |
| 7,363,417 B1* | 4/2008 | Ngai | G06F 13/4022 710/305 |
| 7,401,243 B2 | 7/2008 | Knepper et al. | |
| 7,480,757 B2 | 1/2009 | Atherton et al. | |
| 7,721,118 B1* | 5/2010 | Tamasi | G06F 1/3203 345/502 |
| 2002/0118957 A1 | 8/2002 | Hori et al. | |
| 2005/0022036 A1 | 1/2005 | Hsu | |
| 2005/0097254 A1 | 5/2005 | Su et al. | |
| 2006/0171300 A1 | 8/2006 | Oshikiri et al. | |

(Continued)

OTHER PUBLICATIONS

DC-09110, Dell Patent Application Entitled "System and Method for Dynamic Adjustment of an Information Handling System Graphics Bus", Juenger, 14 pages, Dec. 29, 2011.

*Primary Examiner* — Adnan Baig
(74) *Attorney, Agent, or Firm* — Baker Botts L.L.P.

(57) ABSTRACT

A method for managing the power consumption of an information handling system including a multi-lane serial link having a lane setting that identifies the number of active lanes in the multi-lane serial link. The method may include determining a number of lanes required for the multi-lane serial link based on one or more I/O devices connected to the information handling system, triggering a reduction of the lane setting of the multi-lane serial link if the lane setting of the multi-lane serial link is greater than the determined number of lanes required, and automatically reducing power to the multi-lane serial link in response to the reduction of the lane setting.

18 Claims, 1 Drawing Sheet

(56) References Cited

U.S. PATENT DOCUMENTS

| | | |
|---|---|---|
| 2006/0209680 A1 | 9/2006 | Lee |
| 2006/0212731 A1 | 9/2006 | Han et al. |
| 2006/0236139 A1 | 10/2006 | Chang et al. |
| 2007/0011383 A1 | 1/2007 | Berke et al. |
| 2007/0094437 A1* | 4/2007 | Jabori ................... G06F 1/3253 710/307 |
| 2007/0150197 A1* | 6/2007 | Venkataraman .... G06F 13/4004 701/301 |
| 2007/0276981 A1* | 11/2007 | Atherton ............. G06F 13/4022 710/307 |
| 2009/0006708 A1 | 1/2009 | Lim |
| 2009/0279423 A1 | 11/2009 | Suresh et al. |

* cited by examiner

METHOD AND APPARATUS FOR POWER THROTTLING OF HIGHSPEED MULTI-LANE SERIAL LINKS

CROSS-REFERENCE TO RELATED APPLICATIONS

This application is a continuation of pending U.S. patent application Ser. No. 11/876,401 filed Oct. 22, 2007; the contents of which is incorporated herewith in its entirety by reference.

TECHNICAL FIELD

The present invention is related to information handling systems and, more particularly, power throttling of highspeed multi-lane serial links.

BACKGROUND OF THE INVENTION

As the value and use of information continues to increase, individuals and businesses seek additional ways to process and store information. One option for processing and stored information is an information handling system. An information handling system generally processes, compiles, stores, and/or communicates information or data for business, personal, educational, governmental, or other purposes thereby allowing users to take advantage of the value of the information.

Because technology and information handling needs and requirements vary between different users and/or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is commonly referred to as a server or server system. As suggested by its name, a server system might be described as an information handling system that provides a service to one or more other information handling systems. Server systems include, as examples, application servers dedicated to running specified software applications, database servers that provide database services, file servers that provide file services, web servers that communicate with HTTP (Hypertext transfer protocol) clients to receive and respond to HTTP requests, and numerous other types of servers. Servers, and other information handling systems with similar characteristics, may include a set of pre-determined and/or fixed serial multi-lane links (e.g., PCI Express (PCIe), HyperTransport, QPI bus, etc.) enabling communication with embedded and add-in devices and/or connections.

Power consumption has become an increasingly important aspect or feature of a server system. In servers and other information handling system platforms, high speed serial links consume power. It is anticipated that this power consumption will increase as the speed of serial links increases. While the cost of a system including serial links may be a one time financial impact, the total cost of ownership may be greatly affected by the ongoing cost of energy consumed by the system. Any system or method for reducing the power consumption of high speed serial links may offer an improvement in the overall performance of information handling systems.

Currently, the serial links used in the design of servers and other platforms are assigned a pre-determined or fixed number of lanes based on the anticipated embedded and/or add-in I/O devices and/or connections. These assigned lanes are the result of the original conception of resource bandwidth. Often, the design is intended to handle a so-called worst case bandwidth requirement. That is, the design anticipates the greatest need a user and/or a system might experience. The actual bandwidth used in the operation of the information handling system may be less than the worst-case provision. As the power consumption of serial links has increased, the negative consequences of providing greater bandwidth than is actually needed have also risen.

SUMMARY OF THE INVENTION

The present disclosure describes a system and method for reducing the power consumption of high speed multi-lane serial links in an information handling system. Although the following discussion focuses on high speed multi-lane serial links in the context of servers and server systems, these teachings may be used in a variety of applications related to power management in electronic systems.

In one embodiment, the present disclosure provides a method for managing the power consumption of an information handling system including a multi-lane serial link having a lane setting that identifies the number of active lanes in the multi-lane serial link. The method may include determining a number of lanes required for the multi-lane serial link based on one or more I/O devices connected to the information handling system; triggering a reduction of the lane setting of the multi-lane serial link if the determined number of lanes required is lower than the lane setting of the multi-lane serial link; and automatically reducing power to the multi-lane serial link in response to the reduction of the lane setting.

In another embodiment, the present disclosure provides an information handling system. The information handling system may include a controller and a multi-lane serial link having a lane setting that identifies the number of active lanes in the multi-lane serial link. The controller may be operable to determine a lane requirement for the multi-lane serial link based on one or more I/O devices connected to the information handling system and trigger a reduction of the lane setting to the multi-lane serial link if the lane requirement determined by the controller is lower than the lane setting of the multi-lane serial link.

In another embodiment, the present disclosure provides a computer program product comprising computer executable instructions, stored on a computer readable medium, for managing the power consumption of a multi-lane serial link having a lane setting that identifies the number of active lanes in the multi-lane serial link. The instructions may include: instructions for determining a lane requirement for the multi-lane serial link based on one or more I/O devices connected to the information handling system; instructions for triggering a reduction of the lane setting of the multi-lane serial link if the lane requirement determined is lower than the lane setting of the multi-lane serial link; and instructions for reducing power to the multi-lane serial link in response to the reduction of the lane setting.

Embodiments of the present disclosure may include a various technical advantages. One technical advantage of certain embodiments is the ability to reduce power consumption in high speed multi-lane serial links. Additional advantages may be apparent to those of skill in the art and from the figures, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
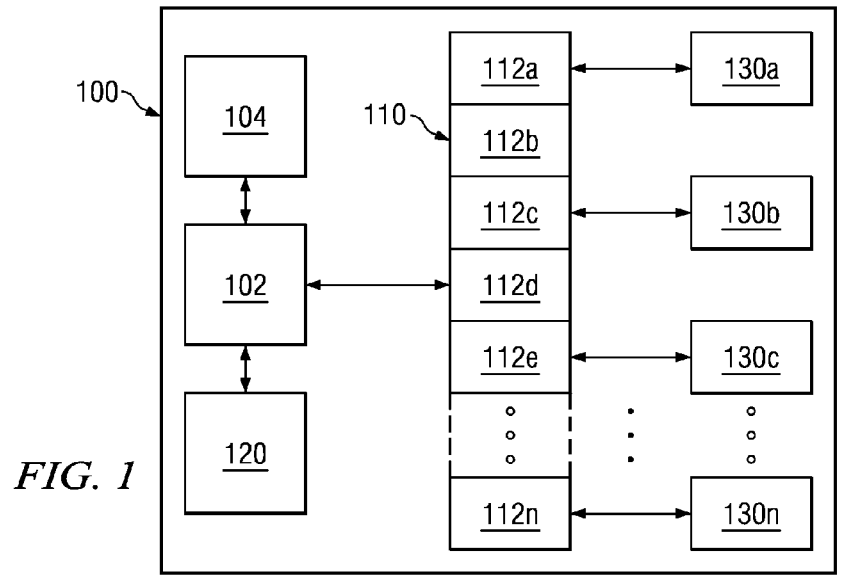
FIG. 1 depicts selected elements of an information handling system which may be used in accordance with teachings of the present disclosure.
Figure 2:
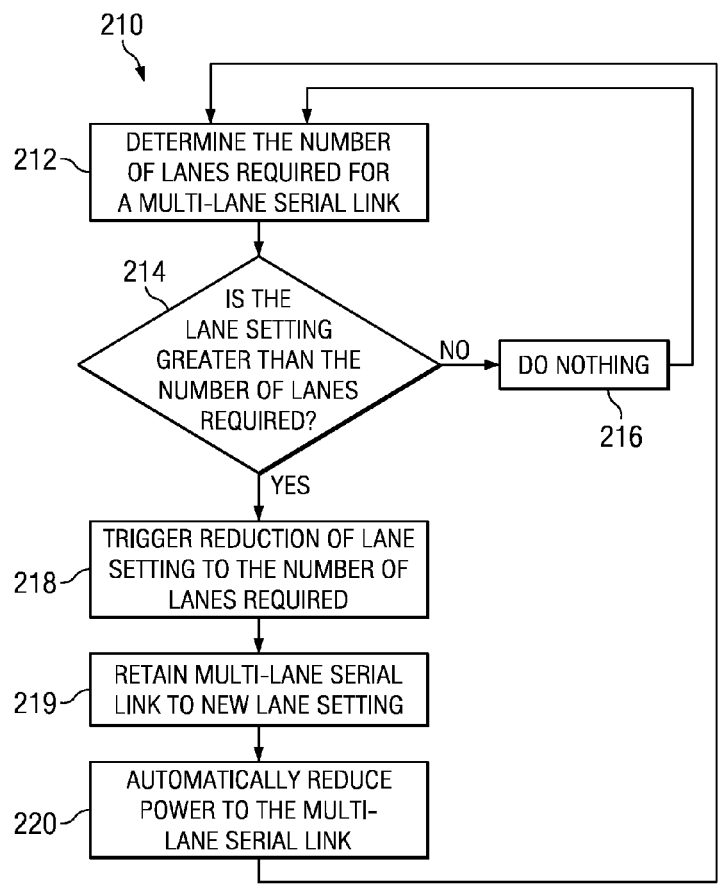
FIG. 2 depicts a flow diagram illustrating a method for managing the power consumption of an information handling system including a multi-lane serial link having a lane setting that identifies the number of active lanes in the multi-lane serial link.

Preferred embodiments of the invention and its advantages are best understood by reference to FIGS. 1-2 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For the purposes of this disclosure, computer-readable media may include any instrumentality, or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

The exemplary implementations of system management resources presented herein may emphasize system management resources in the context of server systems; it should be understood, however, that the system management features described herein may also be appropriate for other classes of information handling systems including, as examples, desktop systems, mobile systems including notebook or lap top systems and hand held systems.

FIG. 1 depicts selected elements of an information handling system 100 incorporating teachings of the present disclosure. In the depicted embodiment, information handling system 100 includes a host 102, a multi-lane serial link 110, a controller 120, and one or more input/output (I/O) devices 130 connected to host 102 through multi-lane serial link 110.

Host 102 may include processing resources, e.g., one or more central processing units (CPUs) and storage resources that are accessible to the processing resources. Storage resources may include volatile storage or memory and/or persistent storage, e.g., disk storage, flash memory or other type of erasable read only memory (ROM), and the like. Host 102 may also include various other peripheral or I/O devices known in the field of data processing system design.

In addition, information handling system 100 may include a device, element and/or programming operating as a boot monitor 104 and associated with host 102. Boot monitor 104 may alternatively be known as a boot loader, boot ROM, and/or a basic input/output system (BIOS). Boot monitor 104 may include firmware or software code that is initiated when host 102 is powered up, whether by a user, automatically, and/or in response to any other signal. Boot monitor 104 may function to initialize peripherals related to host 102. For example, boot monitor 104 may initialize any or all of the following items: a clock generator, processors and caches, a chipset including memory and an input/output controller, system memory, PCI devices, a primary graphics controller, mass storage controllers, input/output controllers (e.g., those associated with a keyboard and/or a mouse), and/or a boot loader for an operating system (OS).

Multi-lane serial link 110 may include any device or element of information handling system 100 configured to facilitate connection or communication between elements of information handling system 100. For example, multi-lane serial link 110 may include an industry standard peripheral bus (e.g., a PCI Express bus, a HyperTransport bus, and/or a QPI bus). In both server and other platform designs, multi-lane serial links 110 are often used with embedded devices, add-in devices, and/or connections.

PCI Express, often abbreviated as PCI-E or PCIe, is a standardized expansion card interface format. In typical usage, PCIe serial links are described by the number of lanes in the serial link. In each lane, a PCIe Generation (or Gen) 1.1 link carries 250 MB of information in each direction. Each lane may simultaneously receive and transmit information.

As shown in the embodiment depicted in FIG. 1, multi-lane serial link 110 may include multiple lanes 112a-112n. For example, multi-lane serial link 110 may comprise a PCIe x8 slot including eight lanes (e.g., lanes 112a-112h). Lanes 112 may be allocated based on the design of information handling system 100 so that one lane 112 is assigned to each peripheral I/O device 130, as shown in FIG. 1, or in any other combination, e.g., such that one lane 112 may connect host 102 to several I/O devices 130, or so that several lanes 112 may connect host 102 to a single I/O device 130. Some embodiments may include an I/O controller between lane 112 and I/O device 130. In some embodiments, multi-lane serial link 110 may have an associated lane setting identifying the number of active lanes 112 in multi-lane serial link 110. For example, a PCIe Gen1 x8 slot may have a default lane setting of eight (8).

Although this disclosure may discuss the components in terms of PCI Express Generation 1 (Gen1) terminology, the teachings of the present disclosure may be applied to PCIe Gen2 applications. It is anticipated that PCIe Gen2 lanes will consume more power than Gen1 lanes. In addition, PCIe Gen2 supports backwards compatibility and, therefore, can be configured to operate according to PCIe Gen1 protocol. HyperTransport and QPI (formerly known as CSI) are examples of alternative high speed multi-lane serial links that can be configured in accordance with the teachings of this disclosure.

Controller 120 may include any element, device, and/or programming operable to interface with host 102 and facilitate operation of information handling system 100. For example, controller 120 may include a boot monitor 104. As another example, controller 120 may include a baseboard management controller (BMC), a remote access card (RAC), an integrated memory controller (IMC), and/or a console management controller (CMC). In some embodiments, a BMC may include a stand-alone processor operable to monitor the resources of information handling system 100 in communication with other resources of information handling system 100 (e.g., BIOS and/or a boot monitor). In embodiments including a BMC, the BMC and boot monitor may work in concert to take an inventory of multi-lane serial links 110 and/or I/O devices 130 at start-up and/or the BMC may work in concert with the CPU or other resources to monitor the workload and/or usage of multi-lane serial link 110.

It should be emphasized that the implementation of information handling system 100 as described above is merely exemplary, particularly with regard to the description of specific types of management controllers and specific types of interfaces and protocols. Other management controllers, interfaces, and protocols may be used in lieu of those described herein. For example, an NC-SI interface may be used. NC-SI is an emerging DTMF standard for a NIC-sideband interface suitable for MII or reduced MII implementations.

I/O devices 130 may include any device and/or connected to host 102 to expand the functionality of information handling system 100. For example, I/O device 130 may include PCI devices, input/output devices (e.g., a keyboard, a mouse, and/or a monitor), and controllers (e.g., integrated storage controllers, input/output controllers, system memory, a primary graphics controller, mass storage controllers, input/output controllers (e.g., those associated with a keyboard and/or a mouse), and the like).

FIG. 1 depicts selected elements of one embodiment of an information handling system incorporating teachings of the present disclosure that may cooperate to manage the power consumption of multi-lane serial link 110. For example, in operation, information handling system 100 may determine the number of lanes 112 required for multi-lane serial link 110 when information handling system 100 or host 102 is initialized and trigger reduction of the lane setting of multi-lane serial link 110 in cases when the number of lanes 112 required is less than the lane setting of multi-lane serial link 110. As another example, in operation, information handling system 100 may determine the number of lanes required at other times during the operation of information handling system 100 and reset the lane setting as appropriate (e.g., triggering an increase in lane setting if the number of lanes 112 required is higher than the current lane setting of multi-lane serial link 110).

Boot monitor 104 may determine the lane requirement of multi-lane serial link 110 at startup of information handling system 100 or host 102. The lane requirement may be based on the number of I/O devices 130 actually connected to multi-lane serial link 110, the number of I/O devices 130 in operation, and/or any of several other variables or considerations. In such embodiments, boot monitor 104 may compare the lane requirement of multi-lane serial link 110 to the current lane setting of multi-lane serial link 110. If the lane requirement and the lane setting are different, boot monitor 104 may cooperate with host 102, controller 120, and/or other components or devices associated with information handling system 100 to trigger a change (e.g., a reduction or an increase) in the lane setting of multi-lane serial link 110 and automatically reduce or increase the power delivered to multi-lane serial link as needed.

In other embodiments, controller 120 and/or host 102 may determine the number of lanes required for multi-lane serial link 110 periodically (e.g., at start up, at scheduled times, at a prompt by a user, and/or any other time during the operation of information handling system 100 and/or host 102). For example, the number of lanes required for multi-lane serial link 110 may change if configuration changes occur (e.g., addition of an I/O device 130, power up of an I/O device 130, and/or removal of an I/O device 130 by physical removal or powering down). If the number of lanes required for multi-lane serial link 110 is different from the current lane setting of multi-lane serial link 110, controller 120 and/or host 102 may trigger a change (e.g., a reduction or an increase) in the lane setting and automatically reduce or increase power to multi-lane serial link 110 in response.

The embodiments described in relation to FIG. 1 may provide advantages in power management of multi-lane serial links. For example, such embodiments may provide a high number of available lanes without the negative consequences of providing power to those lanes when not in use. Nonetheless, persons with ordinary skill in the art will be able to apply these teachings to a variety of components and embodiments.

FIG. 2 depicts a flowchart illustrating one embodiment of a method 210 for managing the power consumption of multi-lane serial link 110 in accordance with the teachings of the present disclosure. In the depicted embodiment, multi-lane serial link 110 may have an associated lane setting identifying the number of active lanes 112 in multi-lane serial link 110. For example, a PCIe Gen1 x8 slot may have a default lane setting of eight (8).

At Step 212, the number of lanes required for a multi-lane serial link 110 may be determined. This determination may be based on the number of I/O devices 130 actually connected to multi-lane serial link 110, the number of I/O devices 130 in operation, and/or any of several other variables or considerations. The determination at Step 212 may take place at boot up of information handling system 100 and/or host 102. In such embodiments, boot monitor 104 may determine the lane requirement of multi-lane serial link 110 based on the actual I/O devices 130 present. In other embodiments, the determination at Step 212 may take place at regular intervals, as requested by a user, and/or at some triggering event (e.g., a "hot" addition of an I/O device 130 or connection, power up of an I/O device 130, and/or "hot" removal of an I/O device 130 by physical removal or powering down).

At Step 214, the lane setting of multi-lane serial link 110 may be compared to the number of lanes required as determined at Step 212. If the lane setting of multi-lane serial link 110 is not greater than the number of lanes required, method 210 may proceed along to Step 216, resulting in no action needed, and may then return to Step 212. In embodiments employing method 210 at start-up, boot monitor 104 may perform this comparison. In embodiments employing method 210 while information handling system 100 and/or host 102 is powered up, controller 120 and/or host 102 may perform this comparison.

If the lane setting of multi-lane serial link 110 is greater than the number of lanes required, method 210 may proceed to Step 218, where the reduction of the lane setting of multi-lane serial link 110 to the number of lanes required may be triggered. In embodiments employing method 210 at start-up, boot monitor 104 may trigger the reduction of lane setting of multi-lane serial link 110. In embodiments employing method 210 while information handling system 100 and/or host 102 is powered up, controller 120 and/or host 102 may trigger the reduction of the lane setting.

Once the reduction of the lane setting of multi-lane serial link 110 is triggered, multi-lane serial link 110 may be retrained to the reduced lane count at Step 219. In embodiments employing method 210 at start-up, boot monitor 104 may trigger the retraining of multi-lane serial link 110. In embodiments employing method 210 while information handling system 100 and/or host 102 is powered up, controller 120 and/or host 102 may trigger the retraining of multi-lane serial link 110.

After multi-lane serial link 110 has been retrained to the reduced lane count, power to multi-lane serial link 110 may be automatically reduced, at Step 220. Step 220 may include reducing and/or eliminating power to unused lanes 112 of multi-lane serial link 110. From Step 220, method 210 may then return to Step 212. Power to multi-lane serial link 110 may be automatically reduced by a software and/or a firmware function in host 102, controller 120, and/or any other component or device in information handling system 100.

In some embodiments incorporating the teachings of this disclosure, information handling system 100 may be configured to retrain the lane setting of multi-lane serial link 110 upward in response to an increased number of lanes required, e.g., increased bandwidth requirement resulting from the addition of new I/O device 130. For example, controller 120 may react to the addition of new I/O device 130 by triggering an increase in the lane setting of multi-lane serial link 110. In such embodiments, the number of active lanes 112 in multi-lane serial link 110 would be increased and, therefore, power delivered to multi-lane serial link 110 may be automatically increased. Power to multi-lane serial link 110 may be automatically increased by a software and/or a firmware function in host 102, controller 120, and/or any other component or device in information handling system 100. Such a system may provide flexibility, increased capacity, and/or better performance when compared to a traditional solution.

The following examples are provided as an example of applying method 210 to information handling system 100, and are not intended to restrict or define the scope of the teachings of the present disclosure. For example, standard PCIe designs allocate a PCIe Gen1 x8 slot for integrated storage controllers. In practice, however, the amount of I/O throughput required by an integrated storage controller is a function of the number of I/O devices connected to the multi-lane serial link. In some server applications, two SAS drives would require only a PCIe Gen1 x1 slot, instead of the PCIe Gen1 x8 slot allocated. Method 210 may reduce the lane setting of multi-lane serial link from eight to one in accordance with teachings of the present disclosure.

As a second example, network interface controllers enabled with a TCP Offload Engine (TOE) are typically allocated a PCIe Gen1 x4 slot. If the TOE function is disabled, however, multi-lane serial link 110 can be scaled back from four lanes to one lane without sacrificing throughput. Method 210 may be used to manage the power consumed by multi-lane serial link 110 and still allow use of the TOE function when desired.

Although the disclosed embodiments have been described in detail, it should be understood that various changes, substitutions and alterations can be made to the embodiments without departing from their spirit and scope.

What is claimed is:

1. A method for managing the power consumption of an information handling system comprising:
   determining at regularly defined intervals a number of lanes required for a multi-lane serial link, wherein the multi-lane serial link is connected to a host associated with the information handling system, wherein the regularly defined intervals are based on initialization of the host, and wherein the number of lanes required is based on:
      determining a number of one or more powered-on I/O devices connected to the multi-lane serial link,
      determining a number of one or more powered-off I/O devices connected to the multi-lane serial link,
      including in the number of lanes required lanes for the number of one or more powered-on I/O devices, and
      excluding from the number of lanes required lanes for the number of one or more powered-off I/O devices;
   triggering a reduction of a lane setting of the multi-lane serial link if the lane setting of the multi-lane serial link is greater than the determined number of lanes required, the lane setting based on the number of active lanes in the multi-lane serial link;
   triggering a reduction of the lane setting of the multi-lane serial link if a powered-on I/O device is powered-off; and
   automatically increasing the lane setting of the multi-lane serial link if an additional powered-on I/O device is connected to the information handling system through the multi-lane serial link.

2. The method of claim 1, further comprising reducing power to the multi-lane serial link in response to the reduction of the lane setting.

3. The method of claim 2, wherein reducing power to the multi-lane serial link includes eliminating power to unused lanes of the multi-lane serial link.

4. The method of claim 2, further comprising:
   triggering an increase of the lane setting of the multi-lane serial link if the lane setting of the multi-lane serial link is less than the determined number of lanes required; and
   increasing power to the multi-lane serial link in response to the increase of the lane setting.

5. The method of claim 1, further comprising decreasing the lane setting of the multi-lane serial link if a powered-on I/O device is removed from the information handling system through the multi-lane serial link.

6. The method of claim 1, wherein determining the number of lanes required for the multi-lane serial link is performed by a boot monitor and wherein triggering of the reduction of the lane setting of the multi-link serial link is performed by the boot monitor.

7. The method of claim 1, wherein determining the number of lanes required for the multi-lane serial link includes determining the type of the one or more powered-on I/O devices connected to the multi-lane serial link.

8. An information handling system comprising:
a host;
a multi-lane serial link connecting one or more I/O devices to the host;
the multi-lane serial link having a lane setting that identifies the number of active lanes in the multi-lane serial link; and
a baseboard management controller associated with the host configured to:
determine at regularly defined intervals a number of lanes required for the multi-lane serial link, wherein the number of lanes required is based on:
determining a number of one or more powered-on I/O devices connected to the multi-lane serial link,
determining a number of one or more powered-off I/O devices connected to the multi-lane serial link,
including in the number of lanes required lanes for the number of one or more powered-on I/O devices, and
excluding from the number of lanes required lanes for the number of one or more powered-off I/O devices;
trigger a reduction of the lane setting of the multi-lane serial link if the lane setting of the multi-lane serial link is greater than the determined number of lanes required, the regularly defined intervals based on initialization of the host;
trigger a reduction of the lane setting of the multi-lane serial link if a powered-on I/O device is powered-off; and
automatically increase the lane setting of the multi-lane serial link if an additional powered-on I/O device is connected to the host through the multi-lane serial link.

9. The information handling system of claim 8, wherein the baseboard management controller reduces power to the multi-lane serial link in response to the reduction of the lane setting.

10. The information handling system of claim 9, wherein reducing power to the multi-lane serial link includes eliminating power to unused lanes of the multi-lane serial link.

11. The information handling system of claim 9, wherein the baseboard management controller triggers an increase of the lane setting of the multi-lane serial link if the lane setting of the multi-lane serial link is less than the determined number of lanes required and increases power to the multi-lane serial link in response to the increase of the lane setting.

12. The information handling system of claim 8, wherein the baseboard management controller decreases the lane setting of the multi-lane serial link if the number of the one or more powered-on I/O devices connected to the host through the multi-lane serial link is decreased.

13. The information handling system of claim 8, wherein the baseboard management controller determines a bandwidth requirement of the one or more powered-on I/O devices connected to the host through the multi-lane serial link based on the number of the one or more powered-on I/O devices.

14. The information handling system of claim 8, wherein the baseboard management controller determines a bandwidth requirement of the one or more powered-on I/O devices connected to the host through the multi-lane serial link based on the type of the one or more powered-on I/O devices.

15. A computer program product comprising computer executable instructions, stored on a non-transitory tangible computer readable medium, for managing the power consumption of a multi-lane serial link having a lane setting that identifies the number of active lanes in the multi-lane serial link, the instructions comprising:
instructions for determining at regularly defined intervals a number of lanes required for the multi-lane serial link, wherein the regularly defined intervals are based on initialization of the host, and wherein the number of lanes required is based on:
determining a number of one or more powered-on I/O devices connected to the multi-lane serial link,
determining a number of one or more powered-off I/O devices connected to the multi-lane serial link,
including in the number of lanes required lanes for the number of one or more powered-on I/O devices, and
excluding from the number of lanes required lanes for the number of one or more powered-off I/O devices;
instructions for triggering a reduction of the lane setting of the multi-lane serial link if the lane setting of the multi-lane serial link is greater than the determined number of lanes required;
instructions for triggering a reduction of the lane setting of the multi-lane serial link if a powered-on I/O device is powered-off; and
instructions for automatically increasing the lane setting of the multi-lane serial link if an additional I/O device is connected to the host through the multi-lane serial link.

16. The computer program product of claim 15, further comprising instructions for reducing power to the multi-lane serial link in response to the reduction of the lane setting.

17. The computer program product of claim 16, wherein reducing power to the multi-lane serial link includes eliminating power to unused lanes of the multi-lane serial link.

18. The computer program product of claim 15, further comprising instructions for increasing power to the multi-lane serial link in response to an increase of the lane setting of the multi-lane serial link.

* * * * *